United States Patent
Arise et al.

(10) Patent No.: US 10,741,815 B2
(45) Date of Patent: Aug. 11, 2020

(54) NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Toshihiko Ogata, Osaka (JP); Kosuke Kurakane, Osaka (JP); Chikara Murakami, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 52 days.

(21) Appl. No.: 16/223,861

(22) Filed: Dec. 18, 2018

(65) Prior Publication Data
US 2019/0189990 A1    Jun. 20, 2019

(30) Foreign Application Priority Data
Dec. 19, 2017  (JP) .................................. 2017-243289

(51) Int. Cl.
| | | |
|---|---|---|
| *H01M 2/16* | (2006.01) | |
| *H01M 4/48* | (2010.01) | |
| *H01M 4/583* | (2010.01) | |
| *H01M 10/0525* | (2010.01) | |
| *H01M 4/587* | (2010.01) | |

(52) U.S. Cl.
CPC ....... *H01M 2/1686* (2013.01); *H01M 2/1653* (2013.01); *H01M 4/483* (2013.01); *H01M 4/583* (2013.01); *H01M 10/0525* (2013.01); *H01M 4/587* (2013.01); *H01M 2220/30* (2013.01)

(58) Field of Classification Search
None
See application file for complete search history.

(56) References Cited

U.S. PATENT DOCUMENTS

| | | |
|---|---|---|
| 2013/0266831 A1 | 10/2013 | Motohashi et al. |
| 2017/0155114 A1 | 6/2017 | Kurakane |
| (Continued) | | |

FOREIGN PATENT DOCUMENTS

| | | |
|---|---|---|
| JP | 200745581 A | 2/2007 |
| JP | 200748581 A | 2/2007 |
| JP | 2009259605 A | 11/2009 |
| (Continued) | | |

OTHER PUBLICATIONS

Office Action dated Apr. 3, 2018 in JP Application No. 2017243289.
(Continued)

*Primary Examiner* — Helen Oi K Conley
(74) *Attorney, Agent, or Firm* — Panitch Schwarze Belisario & Nadel LLP

(57) ABSTRACT

A nonaqueous electrolyte secondary battery includes: a separator including a polyolefin porous film; a porous layer containing a polyvinylidene fluoride-based resin; a positive electrode plate; and a negative electrode plate, wherein a sum of interface barrier energies being a predetermined value, the polyolefin porous film having a puncture strength of a predetermined value, the value represented by Formula (1) below being not less than 0.00 and not more than 0.54, $$|1-T/M|  \quad \text{Formula (1)},$$

and the polyvinylidene fluoride-based resin containing an α-form polyvinylidene fluoride-based resin in an amount of not less than 35.0 mol %.

6 Claims, 2 Drawing Sheets

(56) References Cited

U.S. PATENT DOCUMENTS

2017/0263905 A1    9/2017   Ogata et al.
2017/0365832 A1   12/2017   Ogata et al.

FOREIGN PATENT DOCUMENTS

| JP | 2013171629 A | 9/2013 |
| --- | --- | --- |
| JP | 2013218875 A | 10/2013 |
| JP | 2015122234 A | 7/2015 |
| JP | 2017107848 A | 6/2017 |
| JP | 2017168419 A | 9/2017 |
| JP | 2017226122 A | 12/2017 |

OTHER PUBLICATIONS

Office Action dated Oct. 2, 2018 in JP Application No. 2017243289.

NONAQUEOUS ELECTROLYTE SECONDARY BATTERY

This Nonprovisional application claims priority under 35 U.S.C. § 119 on Patent Application No. 2017-243289 filed in Japan on Dec. 19, 2017, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium secondary batteries, have a high energy density and are thus in wide use as batteries for, for example, personal computers, mobile telephones, and portable information terminals. Such nonaqueous electrolyte secondary batteries have recently been developed as on-vehicle batteries.

Patent Literature 1, for example, discloses a nonaqueous electrolyte secondary battery including a polyolefin porous film whose ratio of a TD critical load distance measured in a scratch test to a MD critical load distance measured in a scratch test falls within a certain range.

CITATION LIST

Patent Literature

[Patent Literature 1]
Japanese Patent Application Publication, Tokukai, No. 2017-107848 (Publication Date: Jun. 15, 2017)

SUMMARY OF INVENTION

Technical Problem

The above conventional nonaqueous electrolyte secondary battery unfortunately has room for improvement in terms of the charge capacity after charge-discharge cycles. In other words, there has been a demand for improvement in the charge capacity property that the above nonaqueous electrolyte secondary battery has after charge-discharge cycles.

It is an object of an aspect of the present invention to provide a nonaqueous electrolyte secondary battery whose charge capacity property after charge-discharge cycles is excellent.

Solution to Problem

A nonaqueous electrolyte secondary battery in accordance with a first aspect of the present invention includes: a nonaqueous electrolyte secondary battery separator including a polyolefin porous film; a porous layer containing a polyvinylidene fluoride-based resin; a positive electrode plate; and a negative electrode plate, in a case where the positive electrode plate and the negative electrode plate have each been processed into a disk having a diameter of 15.5 mm and immersed in a solution of ethylene carbonate, ethyl methyl carbonate, and diethyl carbonate which solution contains $LiPF_6$ at a concentration of 1 M, a sum of respective interface barrier energies measured of a positive electrode active material and a negative electrode active material being not less than 5000 J/mol, the polyolefin porous film having a puncture strength of not less than 26.0 gf/g/m² for a weight per unit area, the polyolefin porous film having a value represented by Formula (1) below which value is not less than 0.00 and not more than 0.54, $$|1 - T/M| \qquad (1)$$

where T represents a critical load distance in a TD in a scratch test under a constant load of 0.1 N, and M represents a critical load distance in an MD in a scratch test under a constant load of 0.1 N, the porous layer being between (i) the nonaqueous electrolyte secondary battery separator and (ii) at least one of the positive electrode plate and the negative electrode plate, the polyvinylidene fluoride-based resin containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin both contained in the polyvinylidene fluoride-based resin, the amount of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

A nonaqueous electrolyte secondary battery in accordance with a second aspect of the present invention is configured as in the first aspect and is further configured such that the positive electrode plate contains a transition metal oxide.

A nonaqueous electrolyte secondary battery in accordance with a third aspect of the present invention is configured as in the first or second aspect and is further configured such that the negative electrode plate contains a graphite.

The nonaqueous electrolyte secondary battery in accordance with a fourth aspect of the present invention is configured as in any one of the first to third aspects and further includes: another porous layer which is provided between (i) the nonaqueous electrolyte secondary battery separator and (ii) at least one of the positive electrode plate and the negative electrode plate.

A nonaqueous electrolyte secondary battery in accordance with a fifth aspect of the present invention is configured as in the fourth aspect and is further configured such that the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin, and a water-soluble polymer.

A nonaqueous electrolyte secondary battery in accordance with a sixth aspect of the present invention is configured as in the fifth aspect and is further configured such that the polyamide-based resin is aramid resin.

Advantageous Effects of Invention

An aspect of the present invention provides a nonaqueous electrolyte secondary battery whose charge capacity property after charge-discharge cycles is excellent.

DESCRIPTION OF EMBODIMENTS

Figure 1:
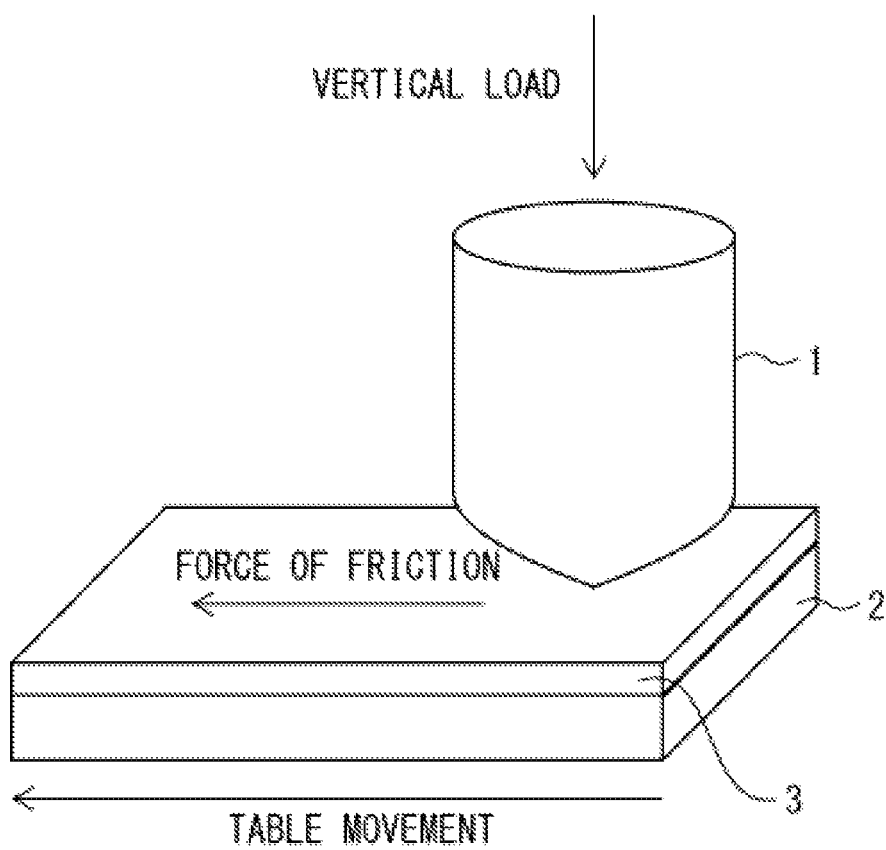
FIG. 1 is a diagram illustrating (i) a device used in a scratch test in accordance with an embodiment of the present invention and (ii) an operation of the device.

The following description will discuss an embodiment of the present invention. The present invention is, however, not limited to the embodiment below. The present invention is not limited to the arrangements described below, but may be altered in various ways by a skilled person within the scope of the claims. The present invention also encompasses in its technical scope any embodiment based on an appropriate combination of technical means disclosed in different embodiments. Any numerical range expressed as "A to B" herein means "not less than A and not more than B" unless otherwise stated.

A nonaqueous electrolyte secondary battery in accordance with an embodiment of the present invention includes: a nonaqueous electrolyte secondary battery separator including a polyolefin porous film; a porous layer containing a polyvinylidene fluoride-based resin (hereinafter referred to also as "PVDF-based resin"); a positive electrode plate; and a negative electrode plate, in a case where the positive electrode plate and the negative electrode plate have each been processed into a disk having a diameter of 15.5 mm and immersed in a solution of ethylene carbonate (EC), ethyl methyl carbonate (EMC), and diethyl carbonate (DEC) which solution contains $LiPF_6$ at a concentration of 1 M, a sum of respective interface barrier energies measured of a positive electrode active material and a negative electrode active material (hereinafter referred to also as "sum of the interface barrier energies) being not less than 5000 J/mol, the polyolefin porous film having a puncture strength of not less than 26.0 gf/g/m$^2$ for a weight per unit area, the polyolefin porous film having a value represented by Formula (1) below which value is not less than 0.00 and not more than 0.54, $$|1-T/M| \quad (1)$$

where T represents a critical load distance in a TD in a scratch test under a constant load of 0.1 N, and M represents a critical load distance in an MD in a scratch test under a constant load of 0.1 N, the porous layer being between (i) the nonaqueous electrolyte secondary battery separator and (ii) at least one of the positive electrode plate and the negative electrode plate, the polyvinylidene fluoride-based resin containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin both contained in the polyvinylidene fluoride-based resin, the amount of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

<Positive Electrode Plate>

The positive electrode plate included in the nonaqueous electrolyte secondary battery in accordance with an embodiment of the present invention is not limited to any particular one as long as the following requirement is met: In a case where the positive electrode plate and the negative electrode plate (described later) have each been processed into a disk having a diameter of 15.5 mm and immersed in a solution of ethylene carbonate, ethyl methyl carbonate, and diethyl carbonate which solution contains $LiPF_6$ at a concentration of 1 M, the sum of the respective interface barrier energies measured of the positive electrode plate and the negative electrode plate is not less than 5000 J/mol. The positive electrode plate is, for example, a sheet-shaped positive electrode plate including (i) as a positive electrode active material layer, a positive electrode mix containing a positive electrode active material, an electrically conductive agent, and a binding agent and (ii) a positive electrode current collector supporting the positive electrode mix thereon. Note that the positive electrode plate may be such that the positive electrode current collector supports the positive electrode mix on both surfaces thereof or one of the surfaces thereof.

The positive electrode active material is, for example, a material capable of being doped with and dedoped of lithium ions. Specific examples of such a material include a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. The positive electrode plate can contain (i) only one kind of electrically conductive agent or (ii) two or more kinds of electrically conductive agents in combination.

Examples of the binding agent includes thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene, as well as acrylic resin and styrene-butadiene-rubber. The binding agent functions also as a thickening agent.

Examples of the positive electrode current collector include electric conductors such as Al, Ni, and stainless steel. Among these, Al is preferable as it is easy to process into a thin film and less expensive.

Examples of a method for producing the sheet-shaped positive electrode plate include: a method in which a positive electrode active material, an electrically conductive agent, and a binder are pressure-molded on a positive electrode current collector; and a method in which (i) a positive electrode active agent, an electrically conductive agent, and a binder are formed into a paste with the use of a suitable organic solvent, (ii) a positive electrode current collector is coated with the paste, and then (iii) the paste is dried and then pressured so that the paste is firmly fixed to the positive electrode current collector.

The particle diameter of the positive electrode active material is expressed as, for example, an average particle diameter (D50) per volume. The positive electrode active material normally has an average particle diameter per volume of approximately 0.1 μm to 30 μm. The volume-based particle size distribution and the average particle diameter (D50) are measured with use of a laser diffraction particle size analyzer (product name: SALD2200, available from Shimadzu Corporation) as an average particle diameter per volume of the positive electrode active material.

The positive electrode active material normally has an aspect ratio (that is, the long-axis diameter/the short-axis diameter) of approximately 1 to 100. The aspect ratio of the positive electrode active material can be determined by, for example, the following method: In an SEM image formed by observing the positive electrode active material on a flat surface from above in a direction perpendicular to the surface, the average is calculated (as the aspect ratio) of the ratios of the respective long-axis dimensions (long-axis diameters) and short-axis dimensions (short-axis diameters)

of 100 particles of the positive electrode active material which 100 particles do not coincide with one another in the thickness direction of the positive electrode active material.

The positive electrode active material layer normally has a porosity of approximately 10% to 80%. The porosity ($\varepsilon$) of a positive electrode active material layer can be calculated, by the formula below, from a density $\rho$ (g/m$^3$) of a positive electrode active material layer, respective mass compositions (weight %) $b^1$, $b^2$, ... $b^n$ of materials that constitute the positive electrode active material layer (e.g., a positive electrode active material, an electrically conductive agent, a binding agent, and others), and respective real densities (g/m$^3$) $c^1$, $c^2$, ... $c^n$ of these materials. Note here that the real densities of the materials may be literature data or may be measured values obtained by a pycnometer method.

$$\varepsilon = 1 - \{\rho \times (b^1/100)/c^1 + \rho \times (b^2/100)/c^2 + \ldots \rho \times (b^n/100)/c^n\} \times 100$$

The positive electrode active material layer normally contains a positive electrode active material at a proportion of not less than 70% by weight. The coating line speed (that is, a speed at which a positive electrode mix containing a positive electrode active material is applied to a current collector; hereinafter referred to as "coating speed") is within a range of 10 m/min to 200 m/min. The coating line speed during the coating operation can be adjusted by appropriately setting the device for applying a positive electrode active material.

<Negative Electrode Plate>

The negative electrode plate included in the nonaqueous electrolyte secondary battery in accordance with an embodiment of the present invention is not limited to any particular one as long as the following requirement is met: In a case where the positive electrode plate and the negative electrode plate have each been processed into a disk having a diameter of 15.5 mm and immersed in a solution of ethylene carbonate, ethyl methyl carbonate, and diethyl carbonate which solution contains LiPF$_6$ at a concentration of 1 M, the sum of the respective interface barrier energies measured of the positive electrode plate and the negative electrode plate is not less than 5000 J/mol. The negative electrode plate is, for example, a sheet-shaped negative electrode plate including (i) as a negative electrode active material layer, a negative electrode mix containing a negative electrode active material and (ii) a negative electrode current collector supporting the negative electrode mix thereon. The sheet-shaped negative electrode plate preferably contains the above electrically conductive agent and binding agent. Note that the negative electrode plate may be such that the negative electrode current collector supports the negative electrode mix on both surfaces thereof or one of the surfaces thereof.

Examples of the negative electrode active material include (i) a material capable of being doped with and dedoped of lithium ions, (ii) lithium metal, and (iii) lithium alloy. Examples of the material include carbonaceous materials. Examples of the carbonaceous materials include natural graphite, artificial graphite, cokes, carbon black, and pyrolytic carbons. The electrically conductive agent and the binding agent may each be any of the examples mentioned above of the electrically conductive agent and the binding agent for the positive electrode active material layer.

Examples of the negative electrode current collector include Cu, Ni, and stainless steel. Among these, Cu is preferable as it is not easily alloyed with lithium in the case of a lithium-ion secondary battery in particular and is easily processed into a thin film.

Examples of a method for producing a sheet-shaped negative electrode plate include: a method in which a negative electrode active material is pressure-molded on a negative electrode current collector; and a method in which (i) a negative electrode active agent is formed into a paste with the use of a suitable organic solvent, (ii) a negative electrode current collector is coated with the paste, and then (iii) the paste is dried and then pressured so that the paste is firmly fixed to the negative electrode current collector. The above paste preferably includes the above electrically conductive agent and binding agent.

The negative electrode active material normally has an average particle diameter (D50) per volume of approximately 0.1 μm to 30 μm.

The negative electrode active material normally has an aspect ratio (that is, the long-axis diameter/the short-axis diameter) of approximately 1 to 10.

The negative electrode active material layer normally has a porosity of approximately 10% to 60%.

The negative electrode active material layer normally contains a negative electrode active material at a proportion of not less than 70% by weight, preferably not less than 80% by weight, more preferably not less than 90% by weight. The coating line speed (that is, a speed at which a negative electrode mix containing a negative electrode active material is applied to a current collector; hereinafter referred to as "coating speed") is within a range of 10 m/min to 200 m/min. The coating line speed during the coating operation can be adjusted by appropriately setting the device for applying a negative electrode active material.

The methods described under "<Positive electrode plate>" can be used to determine the particle diameter, aspect ratio, and porosity of the negative electrode active material, the proportion of the negative electrode active material in the negative electrode active material layer, and the coating speed.

<Respective Interface Barrier Energies of Positive Electrode Active Material and Negative Electrode Active Material>

In a case where the positive electrode plate and the negative electrode plate in accordance with an embodiment of the present invention have each been (i) processed into a disk having a diameter of 15.5 mm and (ii) immersed in an ethylene carbonate/ethyl methyl carbonate/diethyl carbonate solution (concentration: 1 M) of LiPF$_6$, the sum of the respective interface barrier energies measured of the positive electrode plate and the negative electrode plate is not less than 5000 J/mol. The sum of the interface barrier energies is preferably not less than 5100 J/mol, more preferably not less than 5200 J/mol.

In a case where the sum of the interface barrier energies is within the above range, the active material surface in the active material layer allows ions and electric charge to move uniformly, and the reactivity of the entire active material layer is moderate and uniform as a result. This prevents (i) the internal structure of the active material layer from changing easily and (ii) the active material itself from degrading easily.

If the sum of the interface barrier energies is less than 5000 J/mol, the reactivity of the active material layer will be non-uniform, whereby the internal structure of the active material layer may be changed locally, and the active material may be partially degraded (for example, generation of gas) in an excessive manner.

The sum of the interface barrier energies has no particular upper limit. If the sum of the interface barrier energies is excessively high, however, that will undesirably prevent ions and electric charge from moving at the active material surface and thereby prevent the active material from being easily subjected to oxidation-reduction reaction resulting from charge and discharge. The sum of the interface barrier energies may have an upper limit of, for example, approximately 15,000 J/mol.

The above-described sum of the interface barrier energies is determined by measuring the respective interface barrier energies of the positive electrode active material and the negative electrode active material and calculating the sum of the interface barrier energies through the procedure below.

(1) The positive electrode plate and the negative electrode plate are each cut into a disk having a diameter of 15 mm. The polyolefin porous film is also cut into a disk having a diameter of 17 mm for use as a separator.

(2) A mixed solvent is prepared that contains ethylene carbonate, ethyl methyl carbonate, and diethyl carbonate at a volume ratio of 3:5:2. $LiPF_6$ is dissolved in the mixed solvent at 1 mol/L for preparation of electrolyte.

(3) In a CR2032-type electrolytic bath, the negative electrode plate, the separator, the positive electrode plate, a stainless-steel plate (with a diameter of 15.5 mm and a thickness of 0.5 mm), and a waved washer are disposed on top of each other in this order from the bottom of the electrolytic bath. Then, the electrolyte is injected into the electrolytic bath, and the electrolytic bath is lidded, with the result of a coin cell being prepared.

(4) The coin cell prepared is placed in a thermostat bath. An alternating current impedance apparatus (FRA 1255B, available from Solartron) and CellTest System (1470E) are used at a frequency of 1 MHz to 0.1 Hz and a voltage amplitude of 10 mV to draw a Nyquist plot. The thermostat bath has a temperature of 50° C., 25° C., 5° C., or −10° C.

(5) The diameter of a half arc (or an arc of a flat circle) of the Nyquist plot drawn is used to determine the resistance $r_1$-$r_2$ of the positive electrode plate and the negative electrode plate at the electrode active material interface for different temperatures. The resistance $r_1$+$r_2$ is the sum of the resistance of the positive electrode and the negative electrode to ion movement and the resistance of the positive electrode and the negative electrode to electric charge movement. The half arc may be two completely separate arcs or a flat circle made of two overlapping circles. The sum of the interface barrier energies is calculated in accordance with Expressions (4) and (5) below.

$$k=1/(r_1+r_2)=A\exp(-Ea/RT) \quad \text{Expression (4)}$$

$$\ln(k)=\ln\{1/(r_1+r_2)\}=\ln A-Ea/RT \quad \text{Expression (5)}$$

Ea: Sum of the interface barrier energies (J/mol)
k: Transfer constant
$r_1+r_2$: Resistance (Ω)
A: Frequency factor
R: Gas constant=8.314 J/mol/K
T: Temperature of the thermostat bath (K)

Expression (5) is an expression in which natural logarithms of both sides of Expression (4) are taken. In Expression (5), $\ln\{1/(r_1+r_2)\}$ is a linear function of 1/T. Thus, Ea/R is determined from the inclination of an approximate line obtained by plotting the results of substituting the resistance value at each temperature into Expression (5). Substituting the gas constant R into Ea/R allows the sum Ea of the respective interface barrier energies to be calculated.

The frequency factor A is a unique value that does not vary according to temperature changes. This value is determined depending on, for example, the molar concentration of lithium ions in the electrolyte bulk. According to Expression (4), the frequency factor A is the value of $\ln(1/r_0)$ for a case where (1/T)=0, and can be calculated on the basis of the above approximate line.

The sum of the interface barrier energies can be adjusted to a value within a preferable range by, for example, adjusting the ratio between the respective particle diameters of the positive electrode active material and the negative electrode active material to a value not larger than a predetermined value. As an example, (the particle diameter of the positive electrode active material)/(the particle diameter of the negative electrode active material) gives not more than 6.0. If (the particle diameter of the positive electrode active material/the particle diameter of the negative electrode active material) gives an excessively large value, the sum of the interface barrier energies tends to be excessively small.

<Nonaqueous Electrolyte Secondary Battery Separator>

An embodiment of the present invention includes a separator for a nonaqueous electrolyte secondary battery (hereinafter referred to as a "nonaqueous electrolyte secondary battery separator") which separator includes a polyolefin porous film. The description below may use the term "porous film" to refer to a polyolefin porous film.

The porous film itself can be the nonaqueous electrolyte secondary battery separator. The porous film itself can also be a base material of a nonaqueous electrolyte secondary battery laminated separator in which a porous layer (described later) is disposed on the porous film. The porous film contains polyolefin-based resin as a main component and has a large number of pores therein, which pores are connected to one another, so that a gas and a liquid can pass through the porous film from one surface of the porous film to the other.

The nonaqueous electrolyte secondary battery separator in accordance with an embodiment of the present invention may be provided with, disposed on at least one surface thereof, a porous layer (described later) containing a polyvinylidene fluoride-based resin. Further, the nonaqueous electrolyte secondary battery separator in accordance with an embodiment of the present invention may include, in addition to a polyolefin porous film, another layer(s) such as an adhesive layer, a heat-resistant layer, and/or a protective layer.

(Polyolefin Porous Film)

The porous film contains a polyolefin at a proportion of not less than 50% by volume, preferably not less than 90% by volume, more preferably not less than 95% by volume, relative to the entire porous film. The polyolefin preferably contains a high molecular weight component having a weight-average molecular weight within a range of $5\times10^5$ to $\times10^6$. In particular, the polyolefin more preferably contains a high molecular weight component having a weight-average molecular weight of not less than 1,000,000 because such a polyolefin allows the nonaqueous electrolyte secondary battery separator to have a higher strength.

Specific examples of the polyolefin (thermoplastic resin) include a homopolymer or a copolymer each produced by (co)polymerizing a monomer such as ethylene, propylene, 1-butene, 4-methyl-1-pentene, or 1-hexene. Examples of the homopolymer include polyethylene, polypropylene, and polybutene. Examples of the copolymer include an ethylene-propylene copolymer.

Among the above examples, polyethylene is preferable as it is capable of preventing (shutting down) a flow of an excessively large electric current at a lower temperature. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a film thickness of preferably 4 μm to 40 μm, more preferably 5 μm to 30 μm, still more preferably 6 μm to 15 μm.

The porous film only needs to have a weight per unit area which weight is determined as appropriate in view of the strength, film thickness, weight, and handleability of the separator. Note, however, that the porous film has a weight per unit area of preferably 4 g/m$^2$ to 20 g/m$^2$, more preferably 4 g/m$^2$ to 12 g/m$^2$, still more preferably 5 g/m$^2$ to 10 g/m$^2$, so as to allow a nonaqueous electrolyte secondary battery that includes a nonaqueous electrolyte secondary battery laminated separator including the porous film to have a higher weight energy density and a higher volume energy density.

The puncture strength of the porous film for a weight per unit area is not less than 26.0 gf/g/m$^2$, preferably not less than 30.0 gf/g/m$^2$. If the puncture strength is excessively low, that is, less than 26.0 gf/g/m$^2$, when a nonaqueous electrolyte secondary battery separator including the porous film is in use, positive and/or negative electrode active material particles may undesirably pierce through the separator, with the result of a short circuit between the positive electrode and the negative electrode, during, for example, such operations carried out in the battery assembly process as disposing and winding of the positive electrode, the negative electrode, and the separator and pressing of a group of rolls as a product of the disposing and winding or in a case where external pressure has been applied to the battery.

The porous film has an air permeability of preferably 30 sec/100 mL to 500 sec/100 mL, more preferably 50 sec/100 mL to 300 sec/100 mL, in terms of Gurley values. A porous film having an air permeability within the above range can have sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature. Further, in order to obtain sufficient ion permeability and prevent particles from entering the positive electrode and/or the negative electrode, the porous film has pores each having a pore size of preferably not larger than 0.3 μm, more preferably not larger than 0.14 μm.

A porous film can be produced by, for example, (i) a method of adding a pore forming agent to a resin such as polyolefin, shaping the resin into a sheet, then removing the pore forming agent with use of an appropriate solvent, and stretching the sheet from which the pore forming agent has been removed, or (ii) a method of adding a pore forming agent to a resin such as polyolefin, shaping the resin into a sheet, then stretching the sheet, and removing the pore forming agent from the stretched sheet.

The porous film has a value represented by Formula (1) below which value is not less than 0.00 and not more than 0.54. The value represented by Formula (1) below is preferably within a range of not less than 0.00 to not more than 0.50, more preferably not less than 0.00 to not more than 0.45.

$$|1-T/M| \qquad (1)$$

where T represents the critical load distance in the TD in a scratch test under a constant load of 0.1 N, and M represents the critical load distance in the MD in a scratch test under a constant load of 0.1 N.

The porous film has a value represented by Formula (2) below which value is preferably in a range of not less than 0.00 to not more than 0.54, more preferably not less than 0.00 to not more than 0.50, even more preferably not less than 0.00 to not more than 0.45:

$$|1-T/M| \qquad (2)$$

where T represents the critical load distance in the TD in a scratch test under a constant load of 0.1 N, and M represents the critical load distance in the MD in a scratch test under a constant load of 0.1 N.

The respective values represented by Formulae (1) and (2) are each a value representing anisotropy of a critical load distance in a scratch test. A value that is closer to zero indicates that the critical load distance is more isotropic.

As illustrated in FIG. 1, "scratch test" in accordance with an embodiment of the present invention is a test for measuring stress that occurs in a distance by which a porous film as a measurement target object is moved in a horizontal direction while a surface layer of the porous film is subjected to compressive deformation in a thickness direction by applying a certain load to a diamond indenter (i.e. while the diamond indenter is pressed down). Specifically, the scratch test is carried out through the steps below.

(1) The porous film as a measurement target object is cut into a piece having a size of 20 mm×60 mm. The cut piece of the porous film is then bonded to a substrate (glass preparation) having a size of 30 mm×70 mm with use of water-based glue. The bonded product is dried at a temperature of 25° C. for one whole day and night, so that a test sample is prepared. Note that the cut piece of the porous film and the substrate (glass preparation) should be bonded to each other with care so that no air bubble is present between the cut piece of the porous film and the glass preparation.

(2) The test sample prepared in the step (1) is placed on a microscratch testing device (available from CSEM Instruments). Then, while the diamond indenter 1 of the testing device is applying a vertical load of 0.1 N to the test sample, a table of the testing device is moved by a distance of 10 mm in a transverse direction (TD) of the porous film at a speed of 5 mm/min. During the movement of the table, stress (force of friction) that occurs between the diamond indenter and the test sample is measured.

Figure 2:
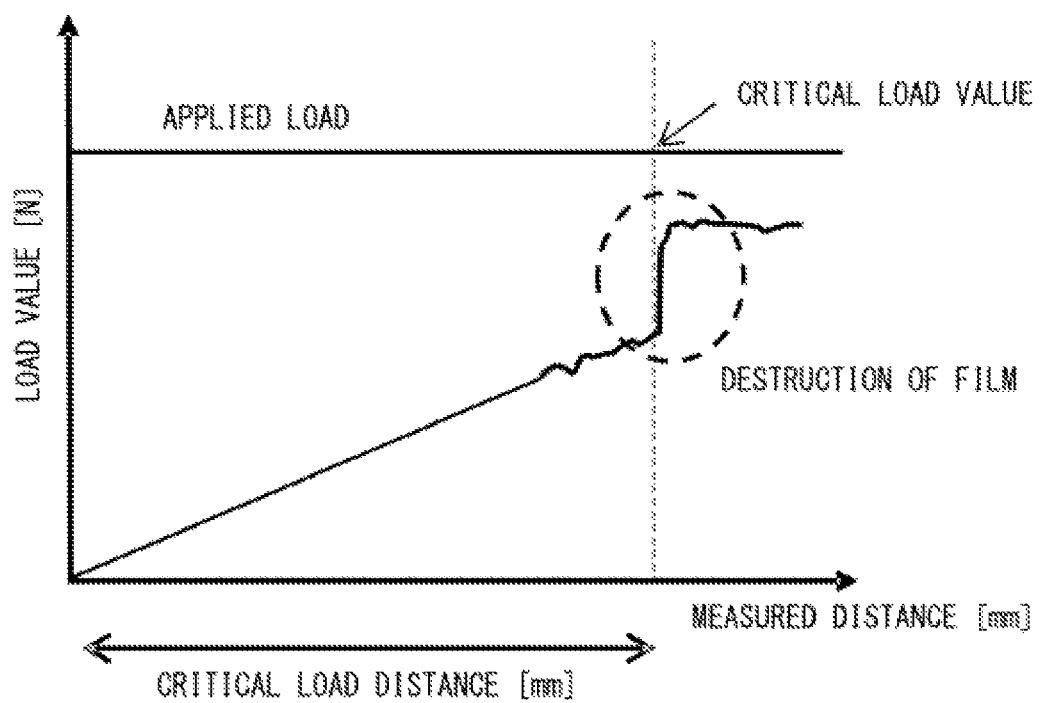
FIG. 2 is a graph which is plotted based on results of a scratch test in accordance with an embodiment of the present invention to show (i) a critical load value and (ii) a distance by which a porous film moves from a starting point of measurement to a point where a critical load is obtained.

(3) A line graph, which shows a relationship between a displacement of the stress measured in the step (2) and the distance of the movement of the table, is made. Then, based on the line graph, the following are calculated as illustrated in FIG. 2: (i) a critical load value in the transverse direction (TD) and (ii) a distance (critical load distance) in the transverse direction between a starting point of measurement and a point where the critical load is obtained.

(4) The direction of the movement of the table is changed to a machine direction (MD), and the above steps (1) through (3) are repeated. Then, the following are calculated: (i) a critical load value in the MD and (ii) the distance (critical load distance) in the MD between a starting point of measurement and a point where the critical load is obtained. The term "TD" stands for "transverse direction", and the term "MD" stands for "machine direction".

Note that any conditions and the like for the measurement in the scratch test other than the conditions described above are similar to those disclosed in JIS R 3255.

The scratch test involves (i) modeling the mechanism in which in a nonaqueous electrolyte secondary battery incorporating a nonaqueous electrolyte secondary battery separator including a porous film as a measurement target object, how expansion (during charging, the negative electrode expands, whereas during discharging, the positive electrode expands) of the electrode active material layer during charging and discharging of the battery influences the surface layer of the porous film facing the expanding electrode and the surface layer of the porous film present on the side opposite to the porous film facing the expanding electrode and (ii) measuring and calculating the influences.

In a nonaqueous electrolyte secondary battery, expansion and shrinkage of the electrode active material layer during charging and discharging causes the surface layer of the porous film facing the expanding electrode to deform in the thickness direction of the porous film (compressive deformation). Further, horizontal expansion of the electrode active material layer causes shearing stress on the porous film in its surface direction. This shearing stress is further transferred through the porous film to the interface between the surface opposite to the surface facing the expanded electrode and the opposite electrode.

The critical load distance calculated through the scratch test thus serves as (a) an indicator of whether the surface layer of the porous film facing the electrode is plastically deformed easily and (b) an indicator of how easily the shearing stress is transferred to the surface opposite to the measurement surface (that is, the surface facing the electrode). If the critical load distance is long, then it indicates that (a') the surface layer of the porous film as the measurement target object is unlikely to be plastically deformed and (b') the shearing stress is unlikely (difficult) to be transferred to the surface opposite the measurement surface of the porous film as the measurement target object.

The above description shows that a porous film having a value represented by Formula (1) which value is larger than 0.54 indicates large anisotropy between the TD and the MD in terms of the critical load distance. In a nonaqueous electrolyte secondary battery including a nonaqueous electrolyte secondary battery separator or nonaqueous electrolyte secondary battery laminated separator including a porous film having such large anisotropy, the difference between the TD and the MD in the degree of plastic deformation of the surface layer of the porous film due to charging and discharging and the difference between the TD and the MD in the degree of transfer of surface stress on that surface of the porous film which is opposite to the surface facing the expanding electrode cause a wrinkle and a gap to occur predominantly in a particular direction at the interface between the nonaqueous electrolyte secondary battery separator or nonaqueous electrolyte secondary battery laminated separator and the electrode.

The nonaqueous electrolyte secondary battery in accordance with an embodiment of the present invention, which has a value represented by Formula (1) above which value is not less than 0.00 and not more than 0.54, is isotropic in terms of the critical load distance. This prevents the pore structure of the porous film from deforming due to charging and discharging, thereby preventing the battery performance from degrading.

In a case where a porous film is provided with a porous layer or another layer each disposed on the porous film, the physical property values of the porous film, which is included in a laminated body including the porous film and a porous layer or another layer, can be measured after the porous layer or other layer is removed from the laminated body. The porous layer or other layer can be removed from the laminated body by, for example, a method of dissolving the resin of the porous layer or other layer with use of a solvent such as N-methylpyrrolidone or acetone for removal.

The following description will discuss a wound nonaqueous electrolyte secondary battery as an embodiment of a laminated secondary battery including electrode plates and a nonaqueous electrolyte secondary battery separator. The term "laminated secondary battery" as used herein refers to a nonaqueous electrolyte secondary battery structured to include electrodes and a nonaqueous electrolyte secondary battery separator that are disposed on each other.

The wound nonaqueous electrolyte secondary battery is wound while tensile force is being applied in the MD to the nonaqueous electrolyte secondary battery separator. This causes an increase in smoothness in the MD of the porous film, and causes internal stress to be inwardly applied to an axis extending in the TD. Therefore, according to the wound nonaqueous electrolyte secondary battery, (i) the critical load distance in the MD during actual operation is longer than the critical load distance, in the MD, which is calculated through the scratch test and (ii) the critical load distance in the TD during actual operation is shorter than the critical load distance, in the TD, which is calculated through the scratch test.

Thus, in a case where the critical load distance in the TD and the critical load distance in the MD are similar (i.e. highly isotropic), specifically, in a case where a porous film having a value of not less than −0.54 and less than 0.00 as represented by Formula (2) is used as a separator or as a member of a separator in a wound nonaqueous electrolyte secondary battery, the critical load distance in the MD increases, whereas the critical load distance in the TD decreases.

Thus, in actual operation, the difference between the TD and the MD in the degree of plastic deformation of the surface layer of the porous film and the difference between the TD and the MD in the degree of transfer of surface stress on that surface of the porous film which is opposite to the surface facing the expanding electrode cause a wrinkle in the porous film and a gap at the interface between the porous film and the electrodes to occur predominantly in the TD, thereby decreasing the uniformity of the distance between the electrodes in the surface direction.

Also in a case where a wound nonaqueous electrolyte secondary battery is highly anisotropic, specifically, the value represented by Formula (1) is larger than 0.54, for a reason similar to the reason above, the difference between the TD and the MD in the degree of plastic deformation of the surface layer of the porous film in a direction in which the critical load distance is large and the difference between the TD and the MD in the degree of transfer of surface stress on that surface of the porous film which is opposite to the surface facing the expanding electrode cause a wrinkle in the porous film and a gap at the interface between the porous film and the electrodes to increase in the direction in which the critical load distance is large. This causes a reduction in a discharge rate characteristic maintaining ratio of the nonaqueous electrolyte secondary battery after discharge cycles. Thus, the value represented by Formula (2) is preferably not less than 0.00 and not more than 0.54 in view of the fact that with such a value, a porous film can be suitably used for a wound nonaqueous electrolyte secondary battery.

The critical load distance in the TD and the critical load distance in the MD should be greatly affected by the following structure factors of a porous film:

(i) How resin molecules are aligned in the MD of the porous film (ii) How resin molecules are aligned in the TD of the porous film (iii) How the resin molecules aligned in the MD and the resin molecules aligned in the TD are in contact with each other with respect to the thickness direction of the porous film Thus, the respective values represented by Formulae (1) and (2) can be controlled by, for example, controlling the above structure factors (i) to (iii) by adjusting the following production conditions of the method described later for producing a porous film:

(1) Circumferential velocity [m/min] of reduction roller (2) Ratio of stretch temperature to stretch magnification [° C./times]

Specifically, the circumferential velocity of the reduction roller and the ratio of the stretch temperature to the stretch magnification during stretching are adjusted so that the circumferential velocity of the reduction roller, the stretch temperature during stretching, and the stretch magnification satisfy the relationship of a Formula (3) below, provided that production of the porous film is not impaired. This allows the respective values represented by Formulae (1) and (2) to be each controlled in a range of not less than 0.00 to not more than 0.54.

$$Y \geq -2.3 \times X + 22.2 \qquad (3)$$

where X represents the circumferential velocity of the reduction roller, and Y represents the ratio of the stretch temperature to the stretch magnification during stretching in the TD.

Meanwhile, in a case where the circumferential velocity of the reduction roller and the ratio of the stretch temperature to the stretch magnification are each set so as to fall outside the range satisfying the relationship of the above Formula (3), (i) the alignment of the resin molecules in the MD of the porous film or the alignment of the resin molecules in the TD of the porous film is promoted and/or (ii) connectivity, in a thickness direction of the porous film, of the resin molecules aligned in the MD or of the resin molecules aligned in the TD is promoted. This causes the anisotropy of the porous film as represented by Formula (1) to be large, so that it is not possible to control the value represented by Formula (1) to fall within the range of not less than 0.00 to not more than 0.54. For example, in a case where the circumferential velocity of the reduction roller is adjusted to 2.5 m/min and where the ratio of the stretch temperature to the stretch magnification is adjusted to less than 16.5° C./times, (i) the alignment of the resin molecules in the TD of the porous film increases and (ii) the thickness direction-wise connectivity of the resin molecules aligned in the TD increases. This causes the critical load distance in the TD to be short, so that the anisotropy as represented by Formula (1) to be not less than 0.54.

In addition, the stretch temperature is preferably not lower than 90° C. and not higher than 120° C., more preferably not lower than 100° C. and not higher than 110° C. Further, the stretch magnification is preferably not less than 600% and not more than 800%, more preferably not less than 620% and not more than 700%.

The structure factor (i) can be controlled primarily by adjusting the production condition (1), the structure factor (ii) can be controlled primarily by adjusting the production condition (2), and the structure factor (iii) can be controlled primarily by adjusting both the production conditions (1) and (2).

In a case where a nonaqueous electrolyte secondary battery laminated separator in accordance with an embodiment of the present invention is to be prepared, that is, a porous layer (described later) containing a polyvinylidene fluoride-based resin is to be disposed on the porous film, the porous film is preferably subjected to a hydrophilization treatment before the porous layer is formed, that is, before the porous film is coated with a coating solution (described later).

Performing a hydrophilization treatment on the porous film further improves coating easiness of the coating solution and thus allows a more uniform porous layer to be formed. The hydrophilization treatment is effective in a case where water accounts for a high proportion of a solvent (dispersion medium) contained in the coating solution. Specific examples of the hydrophilization treatment include publicly known treatments such as (i) a chemical treatment involving an acid or an alkali, (ii) a corona treatment, and (iii) a plasma treatment. Among these hydrophilization treatments, the corona treatment is more preferable because the corona treatment makes it possible to not only hydrophilize the porous film within a relatively short time period, but also hydrophilize only a surface and its vicinity of the porous film to leave the inside of the porous film unchanged in quality.

<Porous Layer>

For an embodiment of the present invention, the porous layer is disposed, as a member of a nonaqueous electrolyte secondary battery, between (i) the nonaqueous electrolyte secondary battery separator and (ii) at least one of the positive electrode plate and the negative electrode plate. The porous layer may be present on one surface or both surfaces of the nonaqueous electrolyte secondary battery separator. The porous layer may alternatively be disposed on an active material layer of at least one of the positive electrode plate and the negative electrode plate. The porous layer may alternatively be provided between the nonaqueous electrolyte secondary battery separator and at least one of the positive electrode plate and the negative electrode plate in such a manner as to be in contact with the nonaqueous electrolyte secondary battery separator and the at least one of the positive electrode plate and the negative electrode plate. There may be a single porous layer or two or more porous layers between the nonaqueous electrolyte secondary battery separator and at least one of the positive electrode plate and the negative electrode plate. The porous layer is preferably an insulating porous layer containing a resin.

It is preferable that a resin that may be contained in the porous layer be insoluble in the electrolyte of the battery and be electrochemically stable when the battery is in normal use. In a case where the porous layer is disposed on one surface of the porous film, the porous layer is preferably disposed on that surface of the porous film which surface faces the positive electrode plate of the nonaqueous electrolyte secondary battery, more preferably on that surface of the porous film which surface comes into contact with the positive electrode plate.

The porous layer in an embodiment of the present invention contains a PVDF-based resin, the PVDF-based resin containing an α-form PVDF-based resin in an amount of not less than 35.0 mol % with respect to 100 mol % of the combined amount of the α-form PVDF-based resin and a β-form PVDF-based resin both contained in the PVDF-based resin.

The content of an α-form PVDF-based resin is calculated by (i) waveform separation of (α/2) observed at around −78 ppm in a $^{19}$F-NMR spectrum obtained from the porous layer and (ii) waveform separation of $\{(\alpha/2)+\beta\}$ observed at around −95 ppm in the $^{19}$F-NMR spectrum obtained from the porous layer.

The porous layer contains a large number of pores connected to one another, and thus allows a gas or a liquid to pass therethrough from one surface to the other. Further, in a case where the porous layer in accordance with an embodiment of the present invention is used as a constituent member of a nonaqueous electrolyte secondary battery laminated separator, the porous layer can be a layer capable of adhering to an electrode as the outermost layer of the separator.

Examples of the PVDF-based resin include homopolymers of vinylidene fluoride, copolymers of vinylidene fluoride and other monomer(s) copolymerizable with vinylidene fluoride, and mixtures of the above polymers. Examples of the monomer copolymerizable with vinylidene fluoride include hexafluoropropylene, tetrafluoroethylene, trifluoroethylene, trichloroethylene, and vinyl fluoride. The present embodiment can use (i) one kind of monomer or (ii) two or more kinds of monomers selected from the above. The PVDF-based resin can be synthesized through emulsion polymerization or suspension polymerization.

The PVDF-based resin contains vinylidene fluoride at a proportion of normally not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer.

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous film layer) included in a nonaqueous electrolyte secondary battery separator than a porous layer not containing one of the two kinds of PVDF-based resins, with the result of a higher peel strength between the two layers. The first resin and the second resin preferably have a mass ratio of 15:85 to 85:15.

The PVDF-based resin has a weight-average molecular weight of preferably 200,000 to 3,000,000, more preferably 200,000 to 2,000,000, even more preferably 500,000 to 1,500,000. A PVDF-based resin having a weight-average molecular weight of not less than 200,000 tends to allow a porous layer and an electrode to adhere to each other sufficiently. A PVDF-based resin having a weight-average molecular weight of not more than 3,000,000 tends to allow for excellent shaping easiness.

The porous layer in accordance with an embodiment of the present invention may contain a resin other than the PVDF-based resin. Examples of the other resin include a styrene-butadiene copolymer; homopolymers or copolymers of vinyl nitriles such as acrylonitrile and methacrylonitrile; and polyethers such as polyethylene oxide and polypropylene oxide.

The porous layer in accordance with an embodiment of the present invention may contain a filler. The filler may be an inorganic or organic filler. The filler is contained at a proportion of preferably not less than 1% by mass and not more than 99% by mass, more preferably not less than 10% by mass and not more than 98% by mass, relative to the combined amount of the PVDF-based resin and the filler. The proportion of the filler may have a lower limit of not less than 50% by mass, not less than 70% by mass, or not less than 90% by mass. The organic or inorganic filler may be a conventionally publicly known filler.

The porous layer in accordance with an embodiment of the present invention has an average thickness of preferably 0.5 μm to 10 μm, more preferably 1 μm to 5 μm, per layer on one surface of the porous film in order to ensure adhesion to an electrode and a high energy density.

A porous layer having a film thickness of not less than 0.5 μm per layer can preferably (i) prevent internal short circuiting resulting from, for example, a breakage of the nonaqueous electrolyte secondary battery and (ii) retain a sufficient amount of electrolyte.

If the porous layer has a thickness of more than 10 μm per layer, the nonaqueous electrolyte secondary battery will have an increased resistance to permeation of lithium ions. Thus, repeating charge-and-discharge cycles will degrade the positive electrode of the nonaqueous electrolyte secondary battery, with the result of a degraded rate characteristic and a degraded cycle characteristic. Further, such a porous layer will increase the distance between the positive electrode and the negative electrode, with the result of a decrease in the internal capacity efficiency of the nonaqueous electrolyte secondary battery.

The porous layer in accordance with the present embodiment is preferably disposed between the nonaqueous electrolyte secondary battery separator and the positive electrode active material layer of the positive electrode plate. The descriptions below of the physical properties of the porous layer are at least descriptions of the physical properties of a porous layer disposed between the nonaqueous electrolyte secondary battery separator and the positive electrode active material layer of the positive electrode plate in a nonaqueous electrolyte secondary battery.

The porous layer only needs to have a weight per unit area which weight is appropriately determined in view of the strength, film thickness, weight, and handleability of the nonaqueous electrolyte secondary battery laminated separator. The porous layer in the nonaqueous electrolyte secondary battery laminated separator normally has a weight per unit area of preferably 0.5 g/m$^2$ to 20 g/m$^2$, more preferably 0.5 g/m$^2$ to 10 g/m$^2$, per layer.

A porous layer having a weight per unit area which weight falls within the above numerical range allows a nonaqueous electrolyte secondary battery including the porous layer to have a higher weight energy density and a higher volume energy density. If the weight per unit area of the porous layer is beyond the above range, the nonaqueous electrolyte secondary battery will be heavy.

The porous layer has a porosity of preferably 20% by volume to 90% by volume, more preferably 30% by volume to 80% by volume, in order to achieve sufficient ion permeability. The pore diameter of the pores in the porous layer is preferably not more than 1.0 μm, more preferably not more than 0.5 μm. In a case where the pores each have such a pore diameter, a nonaqueous electrolyte secondary battery including a nonaqueous electrolyte secondary battery laminated separator including the porous layer can achieve sufficient ion permeability.

The nonaqueous electrolyte secondary battery laminated separator has an air permeability of preferably 30 sec/100 mL to 1000 sec/100 mL, more preferably 50 sec/100 mL to 800 sec/100 mL, in terms of Gurley values. The nonaqueous electrolyte secondary battery laminated separator, which has the above air permeability, allows the nonaqueous electrolyte secondary battery to have sufficient ion permeability.

An air permeability less than the above range means that the nonaqueous electrolyte secondary battery laminated separator has a high porosity and thus has a coarse laminated structure. This may result in a nonaqueous electrolyte secondary battery laminated separator having a lower strength and thus having an insufficient shape stability at high temperatures in particular. An air permeability larger than the above range may, on the other hand, prevent the nonaqueous electrolyte secondary battery laminated separator from having sufficient ion permeability and thus degrade the battery characteristics of the nonaqueous electrolyte secondary battery.

(Crystal Forms of PVDF-Based Resin)

The PVDF-based resin included in the porous layer in accordance with an embodiment of the present invention is such that, assuming that the sum of the respective amounts of an α-form PVDF-based resin and a β-form PVDF-based resin both contained in the PVDF-based resin is 100 mol %, the amount of an α-form PVDF-based resin contained in the PVDF-based resin is not less than not less than 35.0 mol %, preferably not less than 37.0 mol %, more preferably not less than 40.0 mol %, even more preferably not less than 44.0 mol %. Further, the amount of the α-form PVDF-based resin is preferably not more than 90.0 mol %. The porous layer, which contains an α-form PVDF-based resin in an amount within the above range, is suitably usable as a member of a nonaqueous electrolyte secondary battery whose charge capacity after high-rate discharging is excellently maintained, in particular as a member of a nonaqueous electrolyte secondary battery separator or as a member of an electrode of a nonaqueous electrolyte secondary battery.

A nonaqueous electrolyte secondary battery generates heat during charging and discharging due to its internal resistance. A larger amount of heat is generated with a larger electric current, in other words, at a higher rate. The α-form PVDF-based resin of a PVDF-based resin has a melting point higher than the β-form PVDF-based resin thereof, and is less susceptible to thermal plastic deformation. Further, since the β-form PVDF-based resin is structured such that fluorine atoms are present on one side, the β-form PVDF-based resin is known to have a polarity higher than the α-form PVDF-based resin.

For an embodiment of the present invention, the porous layer contains a PVDF-based resin containing an α-form PVDF-based resin at a proportion not less than a certain level. This reduces, for example, deformation of the internal structure of the porous layer and blocking of pores both resulting from the PVDF-based resin being deformed due to heat generated during charging and discharging, in particular a high-rate operation, and prevents Li ions from being present unevenly as a result of interaction between Li ions and the PVDF-based resin, thereby preventing the battery performance from degrading easily.

The PVDF-based resin containing an α-form PVDF-based resin is arranged such that the polymer of the PVDF-based resin contains a PVDF skeleton having molecular chains including a main-chain carbon atom bonded to a fluorine atom (or a hydrogen atom) adjacent to two carbon atoms one of which is bonded to a hydrogen atom (or a fluorine atom) having a trans position and the other (opposite) one of which is bonded to a hydrogen atom (or a fluorine atom) having a gauche position (positioned at an angle of 60°), wherein two or more such conformations are chained consecutively as follows:

$$(TGT\overline{G}; \text{structure}) \quad [\text{Math. 1}]$$

and the molecular chains each have the following type:

$$TGT\overline{G} \quad [\text{Math. 2}]$$

wherein the respective dipole moments of C—$F_2$ and C—$H_2$ bonds each have a component perpendicular to the molecular chain and a component parallel to the molecular chain.

A PVDF-based resin containing an α-form PVDF-based resin has characteristic peaks at around −95 ppm and at around −78 ppm in a $^{19}$F-NMR spectrum.

The PVDF-based resin containing a β-form PVDF-based resin is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The PVDF-based resin containing a β-form PVDF-based resin may be arranged such that the polymer of the PVDF-based resin contains a PVDF skeleton that has a TT-type conformation in its entirety. The PVDF-based resin containing a β-form PVDF-based resin may alternatively be arranged such that a portion of the PVDF skeleton has a TT-type conformation and that the PVDF-based resin containing a β-form PVDF-based resin has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of C—$F_2$ and C—$H_2$ bonds each have a component perpendicular to the molecular chain.

A PVDF-based resin containing a β-form PVDF-based resin has characteristic peaks at around −95 ppm in a $^{19}$F-NMR spectrum.

(Method for Calculating Content Rates of α-Form PVDF-Based Resin and β-Form PVDF-Based Resin in PVDF-Based Resin)

The rate of content of an α-form PVDF-based resin and the rate of content of a β-form PVDF-based resin in the porous layer in accordance with an embodiment of the present invention relative to 100 mol % of the combined content of the α-form PVDF-based resin and the β-form PVDF-based resin may be calculated from a $^{19}$F-NMR spectrum obtained from the porous layer. The content rates are specifically calculated as follows, for example:

(1) An $^{19}$F-NMR spectrum is obtained from a porous layer containing a PVDF-based resin, under the following conditions.

Measurement conditions

Measurement device: AVANCE400 available from Bruker Biospin

Measurement method: single-pulse method

Observed nucleus: $^{19}$F

Spectral bandwidth: 100 kHz

Pulse width: 3.0 s (90° pulse)

Pulse repetition time: 5.0 s

Reference material: $C_6F_6$ (external reference: −163.0 ppm)

Temperature: 22° C.

Sample rotation frequency: 25 kHz (2) An integral value of a peak at around −78 ppm in the $^{19}$F-NMR spectrum obtained in (1) is calculated and is regarded as an α/2 amount.

(3) As with the case of (2), an integral value of a peak at around −95 ppm in the $^{19}$F-NMR spectrum obtained in (1) is calculated and is regarded as an {(α/2)+β} amount.

(4) Assuming that the sum of (i) the content of an α-form PVDF-based resin and (ii) the content of a β-form PVDF-based resin is 100 mol %, the rate of content of the α-form PVDF-based resin (hereinafter referred to also as "α rate") is calculated from the integral values of (2) and (3) in accordance with the following Expression (6):

$$\alpha \text{ rate (mol \%)} = [(\text{integral value at around } -78 \text{ ppm}) \times 2/\{(\text{integral value at around } -95 \text{ ppm}) + (\text{integral value at around } -78 \text{ ppm})\}] \times 100 \quad (6)$$

(5) Assuming that the sum of (i) the content of an α-form PVDF-based resin and (ii) the content of a β-form PVDF-based resin is 100 mol %, the rate of content of the β-form PVDF-based resin (hereinafter referred to also as "β rate") is calculated from the value of the α rate of (4) in accordance with the following Expression (7):

$$\beta \text{ rate (mol \%)} = 100 \text{ (mol \%)} - \alpha \text{ rate (mol \%)} \quad (7)$$

(Method for Producing Porous Layer and Nonaqueous Electrolyte Secondary Battery Laminated Separator)

A porous layer and nonaqueous electrolyte secondary battery laminated separator each in accordance with an embodiment of the present invention may each be produced by any of various production methods.

In an example method, a porous layer containing a PVDF-based resin and optionally a filler is formed through one of the processes (1) to (3) below on a surface of a porous film intended to be a base material. In the case of the process (2) or (3), a porous layer deposited is dried for removal of the solvent. In the processes (1) to (3), the coating solution, in the case of production of a porous layer containing a filler, preferably contains a filler dispersed therein and a PVDF-based resin dissolved therein.

The coating solution for use in a method for producing a porous layer in accordance with an embodiment of the present invention can be prepared typically by (i) dissolving, in a solvent, a resin to be contained in the porous layer and (ii) dispersing a filler in the solvent.

(1) A process of (i) coating a surface of a porous film with a coating solution containing a PVDF-based resin to be contained in a porous layer and optionally a filler and (ii) drying the surface of the porous film to remove the solvent (dispersion medium) from the coating solution for formation of a porous layer.

(2) A process of (i) coating a surface of a porous film with the coating solution described in (1) and then (ii) immersing the porous film into a deposition solvent (which is a poor solvent for the PVDF-based resin) for deposition of a porous layer.

(3) A process of (i) coating a surface of a porous film with the coating solution described in (1) and then (ii) making the coating solution acidic with use of a low-boiling-point organic acid for deposition of a porous layer.

Examples of the solvent (dispersion medium) in the coating solution include N-methylpyrrolidone, N,N-dimethylacetamide, N,N-dimethylformamide, acetone, and water.

The deposition solvent is preferably isopropyl alcohol or t-butyl alcohol, for example.

For the process (3), the low-boiling-point organic acid can be, for example, paratoluene sulfonic acid or acetic acid.

The base material can be, other than a porous film, another film, a positive electrode plate, a negative electrode plate, or the like.

The coating solution may contain an additive(s) as appropriate such as a dispersing agent, a plasticizing agent, a surface active agent, and a pH adjusting agent as a component(s) other than the resin and the filler.

The coating solution can be applied to the porous film by a conventionally publicly known method. Specific examples of such a method include a gravure coater method, a dip coater method, a bar coater method, and a die coater method.

(Method for Controlling Crystal Forms of PVDF-Based Resin)

The crystal form of the PVDF-based resin contained in the porous layer in accordance with an embodiment of the present invention can be controlled on the basis of (i) drying conditions such as the drying temperature, and the air velocity and air direction during drying and (ii) the deposition temperature at which a porous layer containing a PVDF-based resin is deposited with use of a deposition solvent or a low-boiling-point organic acid.

The drying conditions and the deposition temperature, which are adjusted so that the PVDF-based resin contains an α-form PVDF-based resin in an amount of not less than 35.0 mol % with respect to 100 mol % of the total amount of the α-form PVDF-based resin and a β-form PVDF-based resin contained, may be changed as appropriate by changing, for example, the method for producing a porous layer, the kind of solvent (dispersion medium) to be used, the kind of deposition solvent to be used, and/or the kind of low-boiling-point organic acid to be used.

In a case where the coating solution is simply dried as in the process (1), the drying conditions may be changed as appropriate by adjusting, for example, the amount of the solvent in the coating solution, the concentration of the PVDF-based resin in the coating solution, the amount of the filler (if contained), and/or the amount of the coating solution to be applied.

In a case where a porous layer is to be formed through the above process (1), it is preferable that the drying temperature be 30° C. to 100° C., that the direction of hot air for drying be perpendicular to a porous base material or electrode sheet to which the coating solution has been applied, and that the velocity of the hot air be 0.1 m/s to 40 m/s.

Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a porous base material or electrode sheet to which the coating solution has been applied, and that the velocity of the hot air is 0.4 m/s to 40 m/s.

In a case where a porous layer is to be formed through the above process (2), it is preferable that the deposition temperature be −25° C. to 60° C. and that the drying temperature be 20° C. to 100° C. Specifically, in a case where a porous layer is to be formed through the above process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

(Another Porous Layer)

The nonaqueous electrolyte secondary battery in accordance with an embodiment of the present invention can contain another porous layer in addition to (i) the porous film and (ii) the porous layer containing the PVDF-based resin. The another porous layer need only be provided between (i) the nonaqueous electrolyte secondary battery separator and (ii) at least one of the positive electrode plate and the negative electrode plate. The porous layer and the another porous layer may be provided in any order with respect to the nonaqueous electrolyte secondary battery separator. In a preferable configuration, the porous film, the another porous layer, and the porous layer containing the PVDF-based resin are disposed in this order. In other words, the another porous layer is provided between the porous film and the porous layer containing the PVDF-based resin. In another preferable configuration, the another porous layer and the porous layer containing the PVDF-based resin are provided in this order on both surfaces of the porous film.

Examples of a resin which can be contained in the another porous layer in accordance with an embodiment of the present invention encompass: polyolefins; (meth)acrylate-based resins; fluorine-containing resins (excluding polyvinylidene fluoride-based resins); polyamide-based resins; polyimide-based resins; polyester-based resins; rubbers; resins with a melting point or glass transition temperature of not lower than 180° C.; water-soluble polymers; polycarbonate, polyacetal, and polyether ether ketone.

Among the above resins, polyolefins, (meth)acrylate-based resins, polyamide-based resins, polyester-based resins, and water-soluble polymers are preferable.

Preferable examples of the polyolefin encompass polyethylene, polypropylene, polybutene, and an ethylene-propylene copolymer.

Examples of the fluorine-containing resins include polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins include fluorine-containing rubber having a glass transition temperature of not higher than 23° C.

Preferable examples of the polyamide-based resin encompass aramid resins such as aromatic polyamide and wholly aromatic polyamide.

Specific examples of the aramid resin encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aramid resins, poly(paraphenylene terephthalamide) is more preferable.

Preferable examples of the polyester-based resin encompass (i) aromatic polyesters such as polyarylate and (ii) liquid crystal polyesters.

Examples of the rubbers encompass a styrene-butadiene copolymer and a hydride thereof, a methacrylic acid ester copolymer, an acrylonitrile-acrylic acid ester copolymer, a styrene-acrylic acid ester copolymer, an ethylene propylene rubber, and polyvinyl acetate.

Examples of the resin with a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymer encompass polyvinyl alcohol, polyethylene glycol, cellulose ether, sodium alginate, polyacrylic acid, polyacrylamide, and polymethacrylic acid.

Only one kind of these resins to be contained in the another porous layer can be used, or two or more kinds of these resins can be used in combination.

The other characteristics (e.g., thickness) of the another porous layer are similar to those (of the porous layer) described above, except that the porous layer contains the PVDF-based resin.

<Nonaqueous Electrolyte>

A nonaqueous electrolyte that can be contained in a nonaqueous electrolyte secondary battery in accordance with an embodiment of the present invention may be any nonaqueous electrolyte commonly used for a nonaqueous electrolyte secondary battery. The nonaqueous electrolyte can be, for example, a nonaqueous electrolyte prepared by dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The nonaqueous electrolyte can contain (i) only one kind of lithium salt or (ii) two or more kinds of lithium salts in combination.

Examples of the organic solvent to be contained in the nonaqueous electrolyte include carbonates, ethers, esters, nitriles, amides, carbamates, sulfur-containing compounds, and fluorine-containing organic solvents obtained by introducing a fluorine group into any of the above organic solvents. The nonaqueous electrolyte can contain (i) only one kind of organic solvent or (ii) two or more kinds of organic solvents in combination.

<Method for Producing Nonaqueous Electrolyte Secondary Battery>

A nonaqueous electrolyte secondary battery in accordance with an embodiment of the present invention can be produced by, for example, (i) forming a nonaqueous electrolyte secondary battery member in which the positive electrode plate, a nonaqueous electrolyte secondary battery laminated separator, and the negative electrode plate are arranged in this order, (ii) inserting the nonaqueous electrolyte secondary battery member into a container for use as a housing of the nonaqueous electrolyte secondary battery, (iii) filling the container with a nonaqueous electrolyte, and (iv) hermetically sealing the container under reduced pressure.

The nonaqueous electrolyte secondary battery in accordance with an embodiment of the present invention includes, as described above, (i) a nonaqueous electrolyte secondary battery separator including a polyolefin porous film, (ii) a porous layer, (iii) a positive electrode plate, and (iv) a negative electrode plate. The nonaqueous electrolyte secondary battery in accordance with an embodiment of the present invention meets the requirements (i) to (iii) below.

(i) The puncture strength of the polyolefin porous film for a weight per unit area is not less than 26.0 gf/g/m². The polyolefin porous film has a value represented by the above-described Formula (1) below which value is not less than 0.00 and not more than 0.54.

$$|1-T/M| \qquad (1)$$

(ii) The polyvinylidene fluoride-based resin contained in the porous layer contains an α-form polyvinylidene fluoride-based resin in an amount of not less than 35.0 mol % with respect to 100 mol % of the combined amount of the α-form polyvinylidene fluoride-based resin and a β-form polyvinylidene fluoride-based resin both contained in the polyvinylidene fluoride-based resin.

(iii) In a case where a positive electrode plate and a negative electrode plate have each been processed into a disk having a diameter of 15.5 mm and immersed in a solution of ethylene carbonate, ethyl methyl carbonate, and diethyl carbonate which solution contains $LiPF_6$ at a concentration of 1 M, the sum of the respective interface barrier energies measured of a positive electrode active material of the positive electrode plate and a negative electrode active material of the negative electrode plate is not less than 5000 J/mol.

As a result of the requirement (i) being met, the nonaqueous electrolyte secondary battery in accordance with an embodiment of the present invention sufficiently reduces the possibility of short circuiting between the positive electrode and the negative electrode, and prevents the pore structure in the nonaqueous electrolyte secondary battery separator from deforming due to charge-discharge cycles and the structure at the interface between the nonaqueous electrolyte secondary battery separator or nonaqueous electrolyte secondary battery laminated separator and an electrode from deforming due to charge-discharge cycles.

As a result of the requirement (ii) being met, the nonaqueous electrolyte secondary battery in accordance with an embodiment of the present invention is such that the porous layer has a stable structure even after high-rate charging and discharging.

As a result of the requirement (iii) being met, the nonaqueous electrolyte secondary battery in accordance with an embodiment of the present invention is such that the active material surface in the positive electrode active material layer and the negative electrode active material layer allows ions and electric charge to move uniformly during charge-discharge cycles, and the reactivity of the entire active material is moderate and uniform. This prevents (i) the internal structure of the active material layer from changing easily and (ii) the active material itself from degrading easily.

A nonaqueous electrolyte secondary battery that satisfies the above requirements (i) to (iii) thus (a) prevents the structure at the interface between the nonaqueous electrolyte secondary battery separator or nonaqueous electrolyte secondary battery laminated separator and an electrode from deforming due to charge-discharge cycles, thereby preventing the battery performance from degrading easily, (b) is such that the porous layer has a stable structure even after high-rate charging and discharging, preventing the performance from degrading easily due to, for example, blocking of pores resulting from the porous film and/or the porous layer deforming while the battery is in use, and (c) is such that the internal state of the electrode active material layer and the reactivity of the active material itself are kept moderate. The nonaqueous electrolyte secondary battery in accordance with an embodiment of the present invention should, as a result, enjoy improvement in the charge capacity maintaining rate that the battery has at a 1 C charge after repeated charge-discharge cycles (for example, after 100 cycles).

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

In the Examples and Comparative Examples, measurements were made by the methods below.

[Measurement Methods]

(1) Puncture strength of the porous film for a weight per unit area (unit: gf/g/m²)

A porous film material was fixed with a washer having a diameter of 12 mm by use of a handy-type compression tester (model No. KES-G5, available from KATO TECH CO., LTD.). The puncture strength of the porous base material was defined as the maximum stress (gf) measured when the porous film material was punctured with a pin at 200 mm/min. The pin used had a pin diameter of 1 mm and a tip radius of 0.5 R.

(2) Scratch Test

The critical load value and the ratio of the critical load distance in the TD to the critical load distance in the MD were measured through a scratch test. Any conditions and the like for the measurement other than the conditions described below were similar to those disclosed in JIS R 3255. The test involved use of a microscratch testing device (available from CSEM Instruments) as a measurement device.

(2-1) The porous film produced in each of the Examples and Comparative Examples was cut into a piece having a size of 20 mm×60 mm. The cut piece of the porous film was then bonded to a glass preparation having a size of 30 mm×70 mm with use of water-based glue. The bonded product was dried at a temperature of 25° C. for one whole day and night, so that a test sample was prepared. During the bonding, a water-based glue in an amount so small as not to permeate into the porous film was applied to the porous film to form a thin layer, and the cut piece of the porous film and the glass preparation were bonded to each other so that no air bubble was present between the cut piece of the porous film and the glass preparation.

(2-2) The test sample prepared in the step (2-1) was placed on a microscratch testing device (available from CSEM Instruments). Then, while the diamond indenter of the testing device was applying a vertical load of 0.1 N to the test sample, a table of the testing device was moved by a distance of 10 mm in the TD of the porous film at a speed of 5 mm/min. During the movement of the table, stress (force of friction) that occurred between the diamond indenter and the test sample was measured.

(2-3) A line graph, which showed a relationship between a displacement of the stress measured in the step (2-2) and the distance of the movement of the table, was made. Then, based on the line graph, the following were calculated: (i) the critical load value in the TD and (ii) the distance (critical load distance) in the TD between the starting point of measurement and a point where the critical load was obtained.

(2-4) The direction of the movement of the table was changed to the MD, and the above steps (2-1) through (2-3) were repeated. Then, the following were calculated: (i) the critical load value in the MD and (ii) the distance (critical load distance) in the MD between the starting point of measurement and a point where the critical load was obtained.

(3) Method for Calculating α Rate

A piece with a size of approximately 2 cm×5 cm was cut out from each of the laminated separators produced in the Examples and Comparative Examples below. Then, the rate of content (α rate) of an α-form PVDF-based resin in the PVDF-based resin contained in the cutout was measured through the above steps (1) to (4) (that is, by the method for calculating the respective rates of content of the α-form PVDF-based resin and the β-form PVDF-based resin in a PVDF-based resin).

(4) Respective Interface Barrier Energies of Positive Electrode Active Material and Negative Electrode Active Material The sum of the respective interface barrier energies of the positive electrode active material and the negative electrode active material was calculated through the steps (1) to (5) described in the "<Respective interface barrier energies of positive electrode active material and negative electrode active material>" section.

(5) Respective Average Particle Diameters of Positive Electrode Active Material and Negative Electrode Active Material The volume-based particle size distribution and average particle diameter (D50) were measured with use of a laser diffraction particle size analyzer (product name: SALD2200, available from Shimadzu Corporation).

(6) Porosity (Electrode Active Material Layer)

The porosity ε of the positive electrode active material layer or negative electrode active material layer was calculated in accordance with the formula shown in the "<Positive electrode plate>" section.

(7) 1 C charge capacity maintaining rate after 100 cycles

1. Initial Charge and Discharge

Nonaqueous electrolyte secondary batteries each of which was produced in one of the Examples and Comparative Examples and each of which had not been subjected to any charge-discharge cycle were each subjected to four cycles of initial charge and discharge at 25° C. Each of the four cycles of initial charge and discharge was carried out (i) at a voltage ranging from 2.7 V to 4.1 V, (ii) with CC-CV charge at a charge current value of 0.2 C (where the terminal current condition was 0.02 C), and (iii) with CC discharge at a discharge current value of 0.2 C (where the value of an electric current at which a battery rated capacity defined as a one-hour rate discharge capacity was discharged in one hour was assumed to be 1 C; the same applies hereinafter). Note here that the "CC-CV charge" is a charging method in which (i) a battery is charged at a constant electric current set, (ii) after a certain voltage is reached, the certain voltage is maintained while the electric current is being reduced. Note also that the "CC discharge" is a discharging method in which a battery is discharged at a constant electric current until a certain voltage is reached (the same applies hereinafter).

2. Test of Charge Capacity Before a Charge-Discharge Cycle Test

The nonaqueous electrolyte secondary batteries, which had been subjected to initial charge and discharge, were each subjected to charge-discharge cycles. Each of the charge-discharge cycles was carried out with CC-CV charge at a charge current value of 1 C (where the terminal current condition was 0.02 C) and with CC discharge at a discharge current value changed in the order of 0.2 C and 1 C. The nonaqueous electrolyte secondary batteries were subjected to three such charge-discharge cycles at 55° C. for each rate. During the test, the voltage ranged from 2.7 V to 4.2 V.

Then, the 1 C charge capacity at a discharge current value of 1 C at the third cycle for each rate was used as the 1 C charge capacity before cycles.

3. Charge-Discharge Cycle Test

The nonaqueous electrolyte secondary batteries, which had been subjected to initial charge and discharge, were each subjected to 100 charge-discharge cycles at 55° C. Each of the 100 charge-discharge cycles was carried out (i) at a voltage ranging from 2.7 V to 4.2 V, (ii) with CC-CV charge at a charge current value of 1 C (where the terminal current condition was 0.02 C), and (iii) with CC discharge at a discharge current value of 10° C.

4. Test of Charge Capacity after a Charge-Discharge Cycle Test

The nonaqueous electrolyte secondary batteries, which had been subjected to 100 charge-discharge cycles, were each subjected to charge-discharge cycles. Each of the charge-discharge cycles was carried out (i) at a voltage ranging from 2.7 V to 4.2 V, (ii) with CC-CV charge at a charge current value of 1 C (where the terminal current condition was 0.02 C), and (iii) with CC discharge at a discharge current value changed in the order of 0.2 C and 1 C. The nonaqueous electrolyte secondary batteries were subjected to three such charge-discharge cycles at 55° C. for each rate.

Then, the 1 C charge capacity at a discharge current value of 1 C at the third cycle for each rate was used as the 1 C charge capacity after cycles.

5. Charge Capacity Maintaining Rate after 100 Charge-Discharge Cycles

The ratio of the respective charge capacities before and after the 100 charge-discharge cycles, that is, (1 C charge capacity after charge-discharge cycles/1 C charge capacity before charge-discharge cycles), was calculated as the charge capacity maintaining rate after 100 charge-discharge cycles.

Example 1

[Production of Nonaqueous Electrolyte Secondary Battery Laminated Separator]

Ultra-high molecular weight polyethylene powder (GUR4032, available from Ticona Corporation; weight-average molecular weight: 4,970,000) and polyethylene wax (FNP-0115, available from Nippon Seiro Co., Ltd.) having a weight-average molecular weight of 1000 were mixed at a ratio of 70% by weight:30% by weight. Then, to 100 parts by weight of a mixture of the ultra-high molecular weight polyethylene and the polyethylene wax, the following were added: 0.4 parts by weight of antioxidant (Irg1010, available from Ciba Specialty Chemicals Inc.), 0.1 parts by weight of antioxidant (P168, available from Ciba Specialty Chemicals Inc.), and 1.3 parts by weight of sodium stearate. Then, calcium carbonate (available from Maruo Calcium Co., Ltd.) having an average particle diameter of 0.1 μm was further added so as to account for 36% by volume of the total volume of the resultant mixture. Then, the resultant mixture while remaining a powder was mixed with the use of a Henschel mixer, so that a mixture 1 was obtained.

Then, the mixture 1 was melted and kneaded with the use of a twin screw kneading extruder, so that a polyolefin resin composition 1 was obtained. Then, the polyolefin resin composition 1 was rolled with the use of a roller at a circumferential velocity of 3.0 m/min, so that a rolled sheet 1 was obtained. Then, the rolled sheet 1 was immersed in a hydrochloric acid aqueous solution (containing 4 mol/L of hydrochloric acid and 0.5% by weight of a nonionic surfactant) so as to remove the calcium carbonate from the rolled sheet 1. Then, the resultant sheet A was stretched with a stretch magnification of 6.2 times (ratio of the stretch temperature to the stretch magnification=16.9) at 105° C. Furthermore, the resultant sheet was heat fixed at 120° C. so that a porous film 1 was obtained. The weight per unit area of the porous film 1 thus obtained was 6.9 g/m$^2$.

An N-methyl-2-pyrrolidone (hereinafter referred to also as "NMP") solution (available from Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous film 1 so that the applied coating solution weighed 6.0 g per square meter of the PVDF-based resin in the coating solution 1.

The porous film, to which the coating solution had been applied, was immersed into 2-propanol while the coating film was wet with the solvent, and was then left to stand still at −10° C. for 5 minutes. This produced a laminated porous film 1. The laminated porous film 1 produced was further immersed into other 2-propanol while the laminated porous film 1 was wet with the above immersion solvent, and was then left to stand still at 25° C. for 5 minutes. This produced a laminated porous film 1a. The laminated porous film 1a produced was dried at 30° C. for 5 minutes. This produced a laminated separator 1 including a porous layer. Table 1 shows the results of evaluation of the porous film 1 and the laminated separator 1 produced.

[Preparation of Nonaqueous Electrolyte Secondary Battery]

(Positive Electrode Plate)

A positive electrode plate was obtained in which a layer of a positive electrode mix (a mixture of $LiNi_{0.5}Mn_{0.3}Co_{0.2}O_2$, an electrically conductive agent, and PVDF (at a weight ratio of 92:5:3)) was applied on one surface of a positive electrode current collector (aluminum foil). The $LiNi_{0.5}Mn_{0.3}Co_{0.2}O_2$ had a volume-based average particle diameter (D50) of 5 µm. In the positive electrode plate thus obtained, a positive electrode active material layer had a porosity of 40%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 1.

(Negative Electrode Plate)

A negative electrode plate was obtained in which a layer of a negative electrode mix (a mixture of natural graphite, styrene-1,3-butadiene copolymer, and sodium carboxymethyl cellulose (at a weight ratio of 98:1:1)) was applied on one surface of a negative electrode current collector (copper foil).

The natural graphite had a volume-based average particle diameter (D50) of 15 µm. In the negative electrode plate thus obtained, a negative electrode active material layer had a porosity of 31%.

The negative electrode plate was partially cut off so that a negative electrode active material layer was present in an area of 50 mm×35 mm and that this area was surrounded by an area with a width of 13 mm in which area no negative electrode active material layer was present. A portion thus cut was used as a negative electrode plate 1.

As understood from the description above, the positive electrode plate 1 and the negative electrode plate 1 had a (the particle diameter of the negative electrode active material/ the particle diameter of the positive electrode active material) of 3.0. Table 1 shows the results of calculation of the sum of the interface barrier energy of the positive electrode active material of the positive electrode plate 1 and the interface barrier energy of the negative electrode active material of the negative electrode plate 1.

(Assembly of Nonaqueous Electrolyte Secondary Battery)

A nonaqueous electrolyte secondary battery was produced with use of the positive electrode plate 1, the negative electrode plate 1, and the laminated separator 1 by the method below.

In a laminate pouch, the positive electrode plate 1, the laminated separator 1 with the porous layer facing the positive electrode, and the negative electrode plate 1 were disposed (arranged) on top of one another so as to obtain a nonaqueous electrolyte secondary battery member 1. During this operation, the positive electrode plate 1 and the negative electrode plate 1 were arranged so that the positive electrode active material layer of the positive electrode plate 1 had a main surface that was entirely covered by the main surface of the negative electrode active material layer of the negative electrode plate 1.

Subsequently, the nonaqueous electrolyte secondary battery member 1 was put into a bag prepared in advance from a laminate of an aluminum layer and a heat seal layer. Further, 0.25 mL of nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery 1.

Then, the 1 C charge capacity maintaining rate of the nonaqueous electrolyte secondary battery 1 after 100 charge-discharge cycles was measured by the method described in (8) above. Table 1 shows the measurement results.

Example 2

[Production of Nonaqueous Electrolyte Secondary Battery Laminated Separator]

A polyolefin resin composition 2 was prepared as in Example 1 except that (i) ultra-high molecular weight polyethylene powder (GUR4032, available from Ticona Corporation; weight-average molecular weight: 4,970,000) was used in an amount of 72% by weight, (ii) polyethylene wax (FNP-0115, available from Nippon Seiro Co., Ltd.) having a weight-average molecular weight of 1000 was used in an amount of 29% by weight, and (iii) calcium carbonate (available from Maruo Calcium Co., Ltd.) having an average pore size of 0.1 µm was used so as to account for 37% by volume of a total volume of the resultant mixture.

Subsequently, the polyolefin resin composition 2 was rolled with the use of a roller at a circumferential velocity of 4.0 m/min, so that a rolled sheet 2 was obtained. Then, the rolled sheet 2 was subjected to removal of the calcium carbonate, stretching, and heat fixing as in Example 1 except that (i) the stretch temperature was set to 100° C., (ii) the stretch magnification was set to 7.0 times (ratio of the stretch temperature to the stretch magnification=16.9), and (iii) the heat fixing temperature was set to 123° C., so that a porous film 2 was obtained. The weight per unit area of the porous film 2 thus obtained was 5.4 g/m².

A coating solution 1 was applied to the porous film 2 as in Example 1. The porous film, to which the coating solution had been applied, was immersed into 2-propanol while the coating film was wet with the solvent, and was then left to stand still at −5° C. for 5 minutes. This produced a laminated porous film 2. The laminated porous film 2 produced was further immersed into other 2-propanol while the laminated porous film 2 was wet with the above immersion solvent, and was then left to stand still at 25° C. for 5 minutes. This produced a laminated porous film 2a. The laminated porous film 2a produced was dried at 30° C. for 5 minutes. This produced a laminated separator 2 including a porous layer. Table 1 shows the results of evaluation of the porous film 2 and the laminated separator 2 produced.

[Preparation of Nonaqueous Electrolyte Secondary Battery]

A nonaqueous electrolyte secondary battery was prepared by a method similar to the method for Example 1 except that the laminated separator 1 was replaced with the laminated separator 2. The nonaqueous electrolyte secondary battery thus prepared was used as a nonaqueous electrolyte secondary battery 2.

Then, the 1 C charge capacity maintaining rate of the nonaqueous electrolyte secondary battery 2 after 100 charge-discharge cycles was measured by the method described in (8) above. Table 1 shows the measurement results.

Example 3

(Positive Electrode Plate)

A positive electrode plate was obtained in which a layer of a positive electrode mix (a mixture of LiCoO$_2$, an electrically conductive agent, and PVDF (at a weight ratio of 100:5:3)) was applied on one surface of a positive electrode current collector (aluminum foil). The LiCoO$_2$ had a volume-based average particle diameter (D50) of 13 μm. In the positive electrode plate thus obtained, a positive electrode active material layer had a porosity of 31%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 2.

As understood from the description above as well as the description of Example 1, the positive electrode plate 2 and the negative electrode plate 1 had a (the particle diameter of the negative electrode active material/the particle diameter of the positive electrode active material) of 1.1. Table 1 shows the results of calculation of the sum of the interface barrier energy of the positive electrode active material of the positive electrode plate 2 and the interface barrier energy of the negative electrode active material of the negative electrode plate 1.

[Preparation of Nonaqueous Electrolyte Secondary Battery]

The negative electrode plate 1 was used as a negative electrode plate. A nonaqueous electrolyte secondary battery was prepared by a method similar to the method for Example 1 except that the laminated separator 1 was replaced with the laminated separator 2 and that the positive electrode plate 2 was used as a positive electrode plate. The nonaqueous electrolyte secondary battery thus prepared was used as a nonaqueous electrolyte secondary battery 3.

Then, the 1 C charge capacity maintaining rate of the nonaqueous electrolyte secondary battery 3 after 100 charge-discharge cycles was measured by the method described in (8) above. Table 1 shows the measurement results.

Example 4

[Preparation of Porous Layer and Preparation of Laminated Separator]

In N-methyl-2-pyrrolidone, a PVDF-based resin (product name: "Kynar (registered trademark) LBG", available from Arkema Inc.; weight-average molecular weight of 590,000) was stirred and dissolved at 65° C. for 30 minutes so that the solid content was 10% by mass. The resulting solution was used as a binder solution. As a filler, fine alumina particles (product name: "AKP3000", available from Sumitomo Chemical Co., Ltd.; containing 5 ppm of silicon) was used. The fine alumina particles, the binder solution, and a solvent (N-methyl-2-pyrrolidone) were mixed together at the following ratio: The fine alumina particles, the binder solution, and the solvent were mixed together so that (i) the resulting mixed solution contained 10 parts by weight of the PVDF-based resin with respect to 90 parts by weight of the fine alumina particles and (ii) the solid content concentration (fine alumina particles+PVDF-based resin) of the mixed solution was 10% by weight. A dispersion solution (coating solution 2) was thus obtained.

The coating solution was applied by a doctor blade method to the porous film 2 produced in Example 2 so that the applied coating solution weighed 6.0 g per square meter of the PVDF-based resin in the coating solution. This produced a laminated porous film 3. The laminated porous film 3 was dried at 65° C. for 5 minutes. This produced a laminated separator 3. The drying operation involved hot air blown in an air direction perpendicular to the porous film 2 at an air velocity of 0.5 m/s. Table 1 shows the results of evaluation of the laminated separator 3 produced.

[Preparation of Nonaqueous Electrolyte Secondary Battery]

A nonaqueous electrolyte secondary battery was prepared by a method similar to the method for Example 1 except that the laminated separator 1 was replaced with the laminated separator 3. The nonaqueous electrolyte secondary battery thus prepared was used as a nonaqueous electrolyte secondary battery 4.

Then, the 1 C charge capacity maintaining rate of the nonaqueous electrolyte secondary battery 4 after 100 charge-discharge cycles was measured by the method described in (8) above. Table 1 shows the measurement results.

Comparative Example 1

[Preparation of Nonaqueous Electrolyte Secondary Battery Laminated Separator]

A porous film to which a coating solution had been applied as in Example 2 was immersed into 2-propanol while the coating film was wet with the solvent, and was then left to stand still at −78° C. for 5 minutes. This produced a laminated porous film 4. The laminated porous film 4 produced was further immersed into other 2-propanol while the laminated porous film 4 was wet with the above immersion solvent, and was then left to stand still at 25° C. for 5 minutes. This produced a laminated porous film 4a. The laminated porous film 4a produced was dried at 30° C. for 5 minutes. This produced a laminated separator 4 including a porous layer. Table 1 shows the results of evaluation of the laminated separator 4 produced.

[Preparation of Nonaqueous Electrolyte Secondary Battery]

A nonaqueous electrolyte secondary battery was prepared by a method similar to the method for Example 1 except that the laminated separator 4 was used as a nonaqueous electrolyte secondary battery laminated separator. The nonaqueous electrolyte secondary battery thus obtained was used as a nonaqueous electrolyte secondary battery 5.

Then, the 1 C charge capacity maintaining rate of the nonaqueous electrolyte secondary battery 5 after 100 charge-discharge cycles was measured by the method described in (8) above. Table 1 shows the measurement results.

Comparative Example 2

(Negative Electrode Plate)

A negative electrode plate was obtained in which a layer of a negative electrode mix (a mixture of artificial spherocrystal graphite, an electrically conductive agent, and PVDF (at a weight ratio of 85:15:7.5)) was applied on one surface of a negative electrode current collector (copper foil). The artificial spherocrystal graphite had a volume-based average particle diameter (D50) of 34 μm. In the negative electrode plate thus obtained, a negative electrode active material layer had a porosity of 34%.

The negative electrode plate was partially cut off so that a negative electrode active material layer was present in an area of 50 mm×35 mm and that this area was surrounded by an area with a width of 13 mm in which area no negative electrode active material layer was present. A portion thus cut was used as a negative electrode plate 3.

As understood from the description above as well as the description of Example 1, the positive electrode plate 1 and the negative electrode plate 3 had a (the particle diameter of the negative electrode active material/the particle diameter of the positive electrode active material) of 6.8. Table 1 shows the results of calculation of the sum of the interface barrier energy of the positive electrode active material of the positive electrode plate 1 and the interface barrier energy of the negative electrode active material of the negative electrode plate 3.

[Preparation of Nonaqueous Electrolyte Secondary Battery]

The positive electrode plate 1 was used as a positive electrode plate. A nonaqueous electrolyte secondary battery was prepared by a method similar to the method for Example except that the laminated separator 2 was used as a nonaqueous electrolyte secondary battery laminated separator and that the negative electrode plate 3 was used as a negative electrode plate. The nonaqueous electrolyte secondary battery thus obtained was used as a nonaqueous electrolyte secondary battery 6.

Then, the 1 C charge capacity maintaining rate of the nonaqueous electrolyte secondary battery 6 after 100 charge-discharge cycles was measured by the method described in (8) above. Table 1 shows the measurement results.

TABLE 1

| | Laminated separator | | | | Nonaqueous electrolyte secondary battery |
| --- | --- | --- | --- | --- | --- |
| | Porous film | | | | 1 C charge capacity |
| | Puncture strength (gf/(g/m$^2$)) | Scratch test anisotropy \|1-TD/MD\| | Porous layer PVDF α rate | Electrode Barrier E (J/mol) | maintaining rate (%) after 100 cycles |
| Example 1 | 52.5 | 0.42 | 35.3 | 9069 | 84.1 |
| Example 2 | 64.1 | 0.37 | 44.4 | 9069 | 86.3 |
| Example 3 | 64.1 | 0.37 | 44.4 | 12612 | 83.1 |
| Example 4 | 64.1 | 0.37 | 64.3 | 9069 | 83.6 |
| Comparative Example 1 | 64.1 | 0.37 | 34.6 | 9069 | 79.4 |
| Comparative Example 2 | 64.1 | 0.37 | 44.4 | 4883 | 80.7 |

Table 1 shows that the nonaqueous electrolyte secondary batteries produced in Examples 1 to 4 were superior to the nonaqueous electrolyte secondary batteries produced in Comparative Examples 1 and 2 in terms of the charge capacity maintaining rate after charge-discharge cycles.

Table 1 therefore proves that a nonaqueous electrolyte secondary battery that meets the three requirements described in the <Method for producing nonaqueous electrolyte secondary battery> section enjoys improvement in the charge capacity property that the nonaqueous electrolyte secondary battery has after charge-discharge cycles.

Referential Example: Controlling the Interface Barrier Energies

A positive electrode plate and a negative electrode plate were prepared for which the ratio of the respective particle diameters of a positive electrode active material and a negative electrode active material had been adjusted. The sum of the respective interface barrier energies was measured. Specifically, a positive electrode plate and a negative electrode plate were prepared that contained respective active materials each having a particle diameter changed as below while the composition was identical to that for Example 1. Table 2 shows the results of measurement of the respective interface barrier energies of the positive electrode plate and the negative electrode plate.

Further, a nonaqueous electrolyte secondary battery was prepared as in Example 1 except that the above positive electrode plate and negative electrode plate were used. The 1 C charge capacity maintaining rate of the nonaqueous electrolyte secondary battery after 100 charge-discharge cycles was measured. Table 2 shows the results.

TABLE 2

| | Average particle diameter of positive electrode active material (μm) | Average particle diameter of negative electrode active material (μm) | Ratio of particle diameters | Sum of interface barrier energies (J/mol) | 1 C charge capacity maintaining rate (%) after 100 cycles |
|---|---|---|---|---|---|
| Example 1 | 5 | 15 | 3 | 9069 | 84.1 |
| Referential Example | 0.8 | 20.3 | 24.7 | 4228 | 72.1 |

The positive electrode plate and the negative electrode plate for Example 1 were identical in composition to the positive electrode plate and the negative electrode plate for the Referential Example. The ratio of the respective particle diameters of the positive electrode active material and the negative electrode active material, that is, (the particle diameter of the negative electrode active material/the particle diameter of the positive electrode active material), was 3 for Example 1, but was 24.7 for the Referential Example. The sum of the respective interface barrier energies was 9069 J/mol for Example 1, but was only 4228 J/mol for the Referential Example.

These experimental results show that the sum of the interface barrier energies can be effectively controlled by, for example, adjusting the ratio of the respective particle diameters of the positive electrode active material and the negative electrode active material. It is needless to say that the sum of the interface barrier energies may be controlled by another method.

The 1 C charge capacity maintaining rate after 100 charge-discharge cycles was 84.1% for Example 1, but was only 72.1% for the Referential Example. These experimental results more clearly show that controlling the sum of the interface barrier energies so that it is a predetermined value is one factor in maintaining a good charge capacity of a battery after charge-discharge cycles.

INDUSTRIAL APPLICABILITY

A nonaqueous electrolyte secondary battery in accordance with an embodiment of the present invention, which is excellent in the charge capacity property after cycles, is suitable for use as (i) a battery for use in devices such as a personal computer, a mobile telephone, and a portable information terminal and (ii) an on-vehicle battery.

The invention claimed is:

1. A nonaqueous electrolyte secondary battery, comprising:
   a nonaqueous electrolyte secondary battery separator including a polyolefin porous film;
   a porous layer containing a polyvinylidene fluoride-based resin;
   a positive electrode plate; and
   a negative electrode plate,
   in a case where the positive electrode plate and the negative electrode plate have each been processed into a disk having a diameter of 15.5 mm and immersed in a solution of ethylene carbonate, ethyl methyl carbonate, and diethyl carbonate which solution contains $LiPF_6$ at a concentration of 1 M, a sum of respective interface barrier energies measured of a positive electrode active material and a negative electrode active material being not less than 5000 J/mol,
   the polyolefin porous film having a puncture strength of not less than 26.0 $gf/g/m^2$ for a weight per unit area,
   the polyolefin porous film having a value represented by Formula (1) below which value is not less than 0.00 and not more than 0.54, $$|1 - T/M| \quad (1)$$

where T represents a critical load distance in a TD in a scratch test under a constant load of 0.1 N, and M represents a critical load distance in an MD in a scratch test under a constant load of 0.1 N,
   the porous layer being between (i) the nonaqueous electrolyte secondary battery separator and (ii) at least one of the positive electrode plate and the negative electrode plate,
   the polyvinylidene fluoride-based resin containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin both contained in the polyvinylidene fluoride-based resin,
   the amount of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

2. The nonaqueous electrolyte secondary battery according to claim 1, wherein
   the positive electrode plate contains a transition metal oxide.

3. The nonaqueous electrolyte secondary battery according to claim 1, wherein
   the negative electrode plate contains a graphite.

4. The nonaqueous electrolyte secondary battery according to claim 1, further comprising:
   another porous layer which is provided between (i) the nonaqueous electrolyte secondary battery separator and (ii) at least one of the positive electrode plate and the negative electrode plate.

5. The nonaqueous electrolyte secondary battery according to claim 4, wherein
   the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin, and a water-soluble polymer.

6. The nonaqueous electrolyte secondary battery according to claim 5, wherein
   the polyamide-based resin is aramid resin.

* * * * *